Patented Sept. 4, 1951

2,566,716

UNITED STATES PATENT OFFICE 2,566,716

COMBINED CLEANING AND POLISHING COMPOSITION

Carsten F. Boe, Wooddale, and William R. Lowstuter, Wilmington, Del., assignors to Atomix Inc., Wilmington, Del., a corporation of Delaware No Drawing. Application October 3, 1947, Serial No. 777,860

13 Claims. (Cl. 260—17)

1

This invention relates to compositions for treating surfaces which will leave on the treated surface a highly lustrous and protective coating.

While the compositions comprehended by the present invention are particularly adapted for cleaning and polishing lacquered or varnished surfaces, such as the bodies of automobiles and the like, they also are useful for cleaning and coating metal, glass, plastic and other surfaces. They will clean such surfaces to an extent which will restore the original luster of the surface and deposit thereon a thin, durable, highly lustrous and transparent film for future protection of the surface and lasting shine.

A difficulty heretofore encountered in the preparation of a combined cleaning, coating and polishing composition are the compromises which it has been necessary to make. For example, it is known that better deposits are obtained from emulsified compositions having poor emulsion stability. Yet when emulsion stability is poor, the components of the compoistion separate into layers and any abrasive which is present for cleaning purposes settles to the bottom on storage. Hence, such compositions have to be shaken considerably before being used in order to reestablish the homogeneity. Also, it is known that the detergent properties of water make it a desirable compound for such compositions and its presence, along with suitable emulsifying agents, enhances the cleaning properties of the composition. But, the presence of the emulsifying agents which are necessary when water forms an important component of such compositions results in inferior types of deposits being left on the treated surface and deposits or coatings which will water spot and leach out with rain.

To a large extent, polishing compositions in common use at the present time include wax, either in a paste or liquid form, or in combination with a large amount of oil.

In paste waxes, the wax is in the form of small crystals or particles suspended in a small amount of solvent which plasticizes the mass to an extent such as to enable it to be applied evenly to a surface. Such waxes may contain from 15% to 50% of wax, and may contain water and emulsifying agents to render them more easily applied to surfaces. Nevertheless, such waxes require considerable effort to apply, the effort depending upon the hardness of the wax and the amount of solvent present. If the necessary labor is applied to buff deposits left by such compositions to a high luster, they do not possess a durability commensurate with the labor applied, due, possibly, to the fact that a substantial amount

2 of the wax of the coating is removed by the polishing cloth or implement, or to the fact that the wax is of a kind which is not sufficiently hard and has too low a melting point.

Liquid waxes or wax emulsions usually contain the wax, in amounts from about 5% to 15%, suspended in relatively large amounts of a liquid in which the wax is essentially insoluble, although in some instances a small amount of a relatively strong solvent for the wax may be present. However, such liquid waxes, and also the paste waxes, have the disadvantage that the surface to which they are to be applied first must be cleaned. Such preliminary cleaning often is an arduous task, as ordinary washing, even with soap, will not always sufficiently clean the surface of oxidized coatings or dirt films which may have accumulated thereon.

Wax-oil polishes contain relatively little wax, the wax usually being present in amounts less than 2%. In their application, the wax is deposited by means of an oily film which plasticizes the wax crystals or particles. Such polishes are particularly adapted for use on lacquered surfaces which tend to dry out and check or crack due to the gradual disappearance of plasticizers which they contain. To some extent the oil of a wax-oil polish will tend to replasticize the lacquer of the surface treated and thereby tend to restore it to its original flexibility and luster. However, the amount of wax, the only protective agent included in such polishes, is not sufficient to leave an adequate protective, durable film on the surface to which they are applied.

The present invention contemplates compositions which possess the combined properties of a cleaner and a polish, and, in their preferred form, also have properties of a lacquer-coating composition, and which, to a large extent, do not have the disadvantages pointed out above which are possessed by the paste waxes, the liquid waxes and the wax-oil polishes. The preferred form of compositions contemplated by the present invention also will leave a protective film on a surface to which they are applied which is more durable than similar films left by waxes and polishes of the kind above referred to.

The compositions of the present invention are of the oil-in-water emulsion type and may be applied with maximum ease and, may be so compounded as to leave a deposit on the surface being treated which contains more solids than are left by wax-oil polishes heretofore proposed, thereby insuring maximum durability of the protective coating and also a high luster.

We have found that combined cleaning, polishing and coating compositions can be obtained by a combination of resin, or resin-like material, a suitable oleaginous or unctuous material which, when the composition is applied to a surface will eliminate the inherent tackiness of the deposited resin film, and a suitable solvent, dispersing or plasticizing agent for the resin, particularly when the amount of emulsifying agent or agents which is used is maintained below a certain maximum amount, the maximum depending upon whether or not an abrasive is present. Such compositions, although easy to use, achieve an extremely high and lasting gloss.

It is known that the incorporation of a small amount of a resin, or resin-like substance, in a wax blend will improve the characteristics of the blend. However, where more than 30% of the wax is substituted with resins or resin-like substances, difficulties are encountered because the resulting mix or blend loses its waxy characteristics and becomes tacky and resinous. As wax polishes, generally, depend on the waxy characteristics of the material for successful applications, attempts to incorporate larger amounts of resins or resin-like materials in such polishes have not been successful.

While resins usually depend on their film-forming characteristics for producing gloss and shine, the gloss produced from waxes usually is due to a re-arrangement and alignment of the wax crystals or particles due to the rubbing imparted thereto during the buffing operation.

We have found, in the case of automobile polishes, for example, that emulsion cleaners and polishes which contain no wax are easy to use, but the incorporation of more than a fraction of a percent of wax in them usually makes their application and subsequent removal of dirt from the surface being treated more difficult, as only a very small fraction of one percent of the wax can be present in true solution, and any wax which is present and not in solution normally tends to set up and bind together with the dirt. Hence, if a wax composition is to be used for cleaning and polishing a dirty or dull surface, and is to be easily used, any wax crystals or particles which are present, as such, should be in very small amount and preferably of very small particle size, or the composition should be such that the tendency of the wax to set up in a film or layer which is difficult to remove should be counteracted. Also, we have found that it is highly desirable that a combined cleaning, polishing and coating composition of the emulsion type should be such that when applied to a dirty or dull surface to be treated, it should, on breaking of the emulsion due to the evaporation of water and any volatile solvents present resolve itself into two layers of liquids, an underlying layer next to the surface which essentially is of an oily nature, and an overlying layer which contains the dirt, and which preferably contains a water soluble plasticizing and hygroscopic substance such as glycerine. Emulsion compositions which will resolve themselves into two such liquid layers are easily applied as the hydraulic friction between such layers is very small, and the dirt, as removed from the surface being treated, passes into the outer or overlying layer, leaving an oily layer between it and the surface which has a sort of lubricating effect.

More specifically, the combined cleaning, polishing and coating composition is one having a water base and containing a resin or a resin-like substance, a suitable oleaginous or unctuous material such as a wax or an oil, a solvent or plasticizing agent for the oleaginous or unctuous material if it is a solid, such as wax, a solvent for the resinous substance, and, if an abrasive is present, a suitable bodying or thickening agent. Also, it usually is desirable to incorporate into such compositions a fine abrasive which will assist in removal of any oxidized or other film or foreign material from the surface to be treated, but which will not noticeably scratch or mar the surface. Other ingredients which usually we find desirable to include in the composition are a substance which on drying of the composition will form a film with the abrasive present, a gelling agent, a humidicant, such as glycerine, a suitable emulsifying agent or agents, and a cleaning aid or aids which will assist in removing dirt from the surface being treated and carrying it away therefrom. If found desirable, the composition also may include a suitable preservative and any appropriate scenting and coloring agents.

Water forms the base of our combined cleaning, polishing and coating composition. It acts as a carrier for the other constituents or components and also as a solvent for dirt and as a general detergent. Ordinarily, it is present in an amount from 50% to 70%, although greater or lesser amounts may be used, for example, from about 20% to about 90%. The percentage of water just given, as well as the percentage of all of the ingredients hereinafter referred to is by weight.

The resin or resin-like substance or substances act as film-forming agents and cause a protective film which will take a high shine to be left on the surface being treated. To a large extent the shine produced by compositions of the present invention is due to the gloss or clarity of the transparent film left by the resin or resin-like substances, which essentially require a clean and smooth surface to produce a high shine, while wax compositions heretofore proposed are more suitable to produce a temporary shine on the top of rougher and dirty surfaces.

The resins or resin-like substances which we find it most desirable to use are those which have film-forming characteristics, and a high melting point, that is, not lower than between about 50° C. and 100° C., are insoluble in water, soluble in lacquer and paint solvents and which are non-reactive with and will not attack surfaces such as those on which the compositions will be used. The resins or resin-like substances are molecular aggregates of much higher weight than the waxes and show some degree of polymerization.

If the resin or resin-like substance were one having a lower melting point than that indicated above, a film thereof such as would be deposited on the body of an automobile would soften too much and become tacky when subjected to the heat of the summer sun. Also, resins and resin-like substances having such high melting points will usually have a lower vapor pressure and, hence, will deposit longer-lasting films as they will not evaporate off too quickly.

In addition to the characteristics of the resins or resin-like substances already mentioned, they should be such as not to be oxidized easily, even under exposure to sunlight and ultra-violet rays, should show good weather resistance under varied climatic conditions, and preferably should not readily emulsify without a solvent. It should not readily emulsify without a solvent in order that films thereof which are deposited on treated surfaces may be washed with detergents containing emulsifying agents, such as soaps.

There are many resin and resin-like substances which we find meet the above requirements, for example, various erythritols (esters of di-, tri-, tetra- or pentaerythritol, with either wood or gum rosin), halogenated hydrocarbons, substituted polystyrene, etc. Also, we may use oil-soluble resins such as coumarone-indene resins, phenolics, etc. and resins which may be made miscible with mineral oil by the addition of one or more high-boiling solvents which is inert with respect to lacquered surfaces.

In compounding compositions coming within the scope of the present invention, one or more of the resin or resin-like substances may be used, and they preferably are present to the extent of from about 0.1% to 40%. If the compositions also contain wax, as we prefer, the amount of resinous material should not exceed about 20%.

The halogenated hydrocarbons which may be used are those such as chlorinated paraffin wax, chloro-pentane, polymerized vinyl chloride, which may be homo-polymerized with or without simultaneous or subsequent chlorination, or co-polymerized with other suitable vinyl compounds such as vinyl acetate or vinyl cyanide, etc. Those which we normally prefer to use are those which are commercially available. For example, chlorinated hydrocarbons or chlorinated paraffin waxes, containing about 20 to 30 carbon atoms, have a molecular weight of from about 1000 to 1100 and a softening range of about 90° C. to 100° C. They are obtainable in various degrees of chlorination, but we prefer those which are from about 60% to 80% chlorinated. A typical example of a chlorinated hydrocarbon which we use may have the empirical formula of $C_{24}H_{29}Cl_{21}$. The chlorinated hydrocarbons are particularly desirable as the resin constitutent of the compositions as they increase the durability of deposited coatings, due to the fact that they do not easily re-emulsify, oxidize, leach out, etc.

The oleaginous or unctuous material which we prefer to add to the composition to help eliminate tackiness of the film of resin or resin-like substance deposited when the composition is applied to a surface to be treated until such film has dried or set, is a wax or a mixture of waxes, as it will also enhance the polishing characteristics of the compositions. The wax is present, to a large extent, in solution and may be of the softer, easier-polished type, or of the harder type. It is not necessary that the wax or mixture of waxes be permanently retained on the surface being treated, as long as it is present during drying of the resin or resin-like film which is deposited. We prefer to use a combination of softer waxes such as petrolatum, paraffin wax, microcrystalline wax and low melting ozokerite waxes, with harder waxes such as carnauba wax, oxidized microcrystalline waxes, high melting and microcrystalline ozokerite, hydrogenated castor oil, etc. The latter waxes having higher melting points, are less subject to evaporation and oxidation and, therefore, films thereof which may be left upon the treated surface are more durable. However, compositions including the harder waxes usually are so blended that they will readily shine when the layer containing the dirt is brushed off the surface during the period of drying of the resin film.

When oxidized microcrystalline waxes, which inherently are tacky, are used, they should be blended with some other wax or wax-like substance, such as hydrogenated castor oil, which will eliminate their tackiness and raise the melting point of the blend. Such a blend will be slippery, far beyond what would be expected from the amount of hydrogenated castor oil used, will shine and will have other very desirable characteristics in the composition. However, in many instances we find that a blend of carnauba and paraffin waxes are more satisfactory, considering the shine imparted by them and the ease with which layers containing the wax, dirt, etc. can be removed from the deposited resinous film while the latter is drying. Paraffin wax is fairly dull, but a small amount of carnauba wax added to it will raise its melting point and give a blend having good shine characteristics. Blends of carnauba wax and stearic acid also are quite satisfactory; the stearic acid will soften the carnauba wax and impart slip to the blend. Also, as hereinafter set forth, stearic acid, if tetra-ethylene amide oxide, or ammonia is present, will act as an emulsifying agent.

Usually the amount of wax, when present, will be less than the amount of resin or resin-like substances present, and preferably is between about 0.05% and 1%, although in some compositions it may be present up to about 10%. It should not be present in amounts considerably over its solubility as removal of dirt and abrasive then becomes difficult, particularly if the wax is one of the harder types, and a streaked and greasy surface results. Very satisfactory results have been obtained with lacquer cleaning and polishing compositions containing less than 0.5% of wax.

While the wax or other oleaginous or unctuous substance is an important constituent of the present composition for the reason set forth above, and because it gives good temporary protection to the resin or resin-like film which is deposited, we do not rely upon any wax present in the composition to impart lasting protection to the polished surface. The lasting and superior protection and high gloss which is obtained by the use of our compositions is due primarily to the resin or resin-like film which is deposited on the surface being treated.

The solvents for the resin or resin-like substances and the wax or waxes must be capable of keeping them, to a large extent, in solution.

Solvents which we have found suitable for the resin or resin-like substances and the wax are the fatty acid esters, for example, methyl, ethyl and butyl esters of oleic and stearic acids, and oleic acid itself, as they are active solvents for the resin and resin-like substances present in the composition, are compatible with mineral oil which, as hereinafter indicated, is preferred as a major solvent constituent, have about the same viscosity as, and volatilize in the same range with mineral oil, are not tacky, have good gloss characteristics in themselves, on evaporation deposit the resin or resin-like substances in a uniform film and eliminate the natural tackiness thereof, and provide slip and buffing qualities to deposited films during evaporation of other more volatile solvents which may be present. The lower alkyl fatty acid esters also show great affinity for nitrocellulose lacquers and lacquered surfaces and impart a silky feeling to such surfaces. Further, they are poor solvents for the waxes and, when used along with the waxes in the compositions of the invention, the waxes are precipitated out first to form a wax-containing layer on top of a layer or film containing most of the resin or resin-like substance or substances. Butyl oleate and butyl stearate are particularly good solvents for the resin and resin-like substances.

As indicated, we prefer to use mineral oil as the major part of the solvent. The mineral oil should be one having a boiling point between about 250° F. and 600° F., a specific gravity of from about 0.8 to 0.9, and of suitable viscosity and volatility. It should not be reactive with butyl stearate, butyl oleate, or other fatty acid esters which may be used as the active solvent for the resinous substances, yet it should be compatible with the fatty acid esters and the resins and harmless to lacquered surfaces.

We believe it desirable that the solvent or solvent mixture be so composed that, when the emulsion breaks, the waxes are precipitated out first in order to form an oil-resin-wax layer or film next to the surface being treated, with a high concentration of resin adjacent the surface and a high concentration of wax in the outer layers which will impart initial slip and prevent tackiness of the underlying resinous layer during the first few days when this resinous coating film left on the surface is drying. The outer or overlying layer which contains most of the wax also protects the underlying resinous film from dust, rain, etc. until it thoroughly dries or sets. The outer or overlying layer or film containing most of the wax further possesses characteristics which enable it to be buffed to a good shine from time to time without effecting the underlying layer of resinous material. However, it may be that there are other important factors in connection with the formation of such films, for example, the relative wetting ability of the wax and the resin or resin-like substances with respect to each other and to the surface being treated.

The solvents for the resin or resin-like substances, and the wax preferably are ones which will form solutions with those components, when the latter are used in the above recited amounts, of relatively low viscosities; otherwise the composition cannot be as easily removed and has a greater tendency to smear. However, as the wax or waxes which are used are not soluble to a substantial extent in the mineral oil, a small portion of the wax may be present in suspension.

The mineral oil which we prefer to use as a solvent ingredient preferably is a white mineral oil or lubricating oil of low specific gravity, such as a white mineral oil having a specific gravity of 0.82. It should have a medium evaporating rate and a drying rate of from about two hours to two days. If it has a faster drying rate, there is a tendency for the waxes to precipitate out too early and for any abrasive used in the composition to set up with the wax crystals in the resinous film too soon for example during the time required to polish an automobile, and not to rub off easily and leave a highly polished surface. The white mineral oil also will act as a fluid carrier for any wax or resinous solids which are not dissolved in the solvent mixture. The mineral oil further acts as a polishing agent, particularly if the composition also contains glycerine, to give a uniform, non-greasy, non-streaky distribution of the wax and resinous solids, whether these are in solution or not.

When the compositions do not contain wax, the mineral oil may serve as the oleaginous or unctuous substance to eliminate tackiness of the deposited resinous film while the latter is drying.

The fatty acid esters which form the active solvent for the resin or resin-like substances preferably are used in amounts between about 0.06% to 6%, depending on the amount of resin or resin-like substances which are used.

The mineral oil, although a poor solvent for the wax, functions as the main wax solvent, and also as a partial solvent for the resin or resin-like substance. It should be present in amount greater than the fatty acid esters, and preferably is used in amounts between about 6% and 25%, depending on the amount of wax and resin or resin-like substance present. As far as we have been able to ascertain, any solvent which would be a good solvent for wax, would be so highly active that if used in appreciable amounts would attack a lacquered surface to which the compositions would be applied. Any such wax solvents, if used, should be used in such relatively minor amounts that the solvent combination as a whole will not adversely attack or affect lacquered surfaces to which the compositions may be applied during the drying period.

If the compositions do not include wax, and reliance is placed on the mineral oil to eliminate the tackiness of the resinous layer while it is drying, at least a part of the mineral oil should have a boiling point which is higher than the fatty acid ester or other solvent or plasticizer for the resin. If the compositions contain wax, this is not esential.

The fatty acid esters further act to enhance the action of the mineral oil in restoring the plasticity or flexibility of dried-out lacquered surfaces, particularly nitrocellulose surfaces to which the compositions may be applied. They also aid in properly emulsifying the composition, without tending to coagulate the emulsion, and enhance the polishing characteristics of the compositions.

To facilitate separation of deposited layers of the composition, when the emulsion breaks, into films, one of which is concentrated with respect to the resinous material, and the other of which is concentrated with respect to the waxy constituent, there should be a certain amount of incompatibility between the wax or other oleaginous or unctuous material and the resinous material in solution. Our investigations also have led us to believe that there should be some incompatibility between the resins and waxes and the solvent combination.

If the resins and waxes were completely compatible, films or layers deposited by the compositions probably would contain the resins and waxes more or less uniformly distributed throughout them.

The incompatibility between the resins and the waxes should be in solution.

In melts, the resins and waxes may be compatible, and preferably are as that, to some extent, would insure against dull films when the mineral or other oil has evaporated from treated surfaces. If desired, agents which increase or decrease the incompatibility between the resins and waxes may be incorporated. For exvample, if the resins and waxes are incompatible to a too great an extent, their compatibility may be increased by the incorporation of substances such as stearates or pentaerythritol, which are intermediates between resins and waxes.

A certain amount of incompatibility between the resins and waxes and the solvent combination seems desirable to facilitate separation of deposited layers of the compositions, on breaking of the emulsion, resulting in a concentration of resins close to the surface being treated, with the waxes concentrated in a layer or film on top of them. Without this incompatibility, the resins and waxes would have a tendency to diffuse into each other to such an extent that the top surface would become very tacky and not waxy, as desired. The inherent tackiness of the resinous material also will cause it to have a preferential affinity for the surface being treated which further insures a concentration of the resinous material next to such surface.

The volatility of the solvent combination appears to be a factor in connection with the compatibility of the resin and waxes, and of the resins and waxes with the solvent combination. As the solvents evaporate from deposited coatings during their drying, which may extend over a period of weeks, the concentration of the resin and wax solids increase in the remaining solvent until a point is reached where the amount of resin is relatively large with respect to the remaining solvent. If the wax is soluble to a very large extent in the resin in melts, the influence of the resin may be sufficiently great to dissolve the wax in the resinous, oil-plasticized film and leave such films with a tacky surface, so that no benefit is obtained from the presence of the wax. Hence, the solvent combination should not be too volatile, and the waxes should be only sparingly soluble in the solvent in which the resin is soluble, and not too compatible with the resins, at least in the presence of small amounts of the solvent combination.

Other solvents may be included, in small amounts, in the composition when desired, for example, glycolmonethyl ether, diethylene glycol monoethyl ether, glycol monobutyl ether, diethylene glycol monobutyl ether, glycol monomethyl ether, amylacetate, diacetone, dioxane, alcohols, carbon tetrachloride, light kerosene, naphtha, Stoddard solvent, etc.

Additional solvents such as glycol-monoethyl ether, diethylene glycol monoethyl ether, glycol monobutyl ether, diethylene glycol monobutyl ether, glycol monomethyl ether, are most desirable where it is desired to alter or vary the relative wetting ability of the wax and resin or resin-like substances with respect to surfaces to be treated. Such solvents are mutually soluble in oil and water and are representative of a whole series of ether glycol type solvents and their homologues. They also function as solvents for emulsion agents and wax and resinous solids, and are desirable cleaning compounds for both water and oil soluble dirt. Such solvents further act as coupling agents for any petroleum solvent present in the composition and thereby assist in carrying dirt removed from the surface being treated by the petroleum solvent away from the surface and into the outer or overlying layer or film containing most of the water-soluble gums and abrasive.

It is immaterial whether or not such additional solvents, as referred to above, are of themselves active lacquer solvents, as long as the total solvent is not substantially active as a lacquer solvent, and the active component has a relatively low boiling point so that it will evaporate off fast. However, active lacquer solvents having higher boiling points, such as cyclohexanol, phthalates, etc. should not be used as they would be too reactive with lacquer finishes and would evaporate off too slowly. The addition of small amounts of low-boiling solvents such as light kerosene, carbon tetrachloride, Stoddard solvents, low-boiling naphtha, etc. are desirable as they also perform a cleaning function in the composition. Preferably the solvents having a higher solvent power for oil and water soluble dirt are used. When the composition is one containing an abrasive, such additional solvent may be Stoddard solvent (boiling range between about 300° and 400° F.). It should be used in an amount equal to about one-half the amount of mineral oil present. Large amounts often will streak surfaces which are not in good condition, while substantially smaller amounts will not have the desired cleaning effect with respect to oil and water soluble dirt. If the composition does not contain an abrasive, the oil and water soluble dirt solvent may be a low-boiling naphtha. The use of naphtha as a dirt solvent is not desirable when the composition contains an abrasive, as the abrasive particles increase the rate of evaporation of the naphtha too greatly.

The dirt solvents, including water, which are present in the composition are effective while the composition is being applied, but evaporate off rapidly with the water so that they are not present when the treated surface subsequently is buffed to give it a high polish. However, the wax and resin or resin-like solvents do not evaporate off to any great extent by the time the surface is buffed, but it is preferred that, subsequently, the wax solvents evaporate off before the solvent for the resin or resin-like substance, which in some cases may be readily accomplished by means of the relatively high solvent-retention power of the resins, or by using a higher boiling solvent.

As most surfaces to be treated will have on them a film of dirt or oxide, the composition preferably contains an abrasive, although if compounded for cleaning furniture or the like the abrasive may be omitted. Diatomaceous earth has proven to be a satisfactory abrasive, although other fine abrasives may be used in its place. The harsher abrasives ordinarily are not satisfactory where lacquered and similar surfaces are to be treated, as their abrasive action is too great and they tend to objectionably mar the surfaces being treated. In addition to removing dirt from the surfaces being treated, the abrasive further acts as a sorption agent for removed dirt, water and glycerine. The abrasive further acts as a polishing and separating medium between the applying cloth or implement and the oiled surface. It also gives a large surface area, and thereby hastens the drying of the composition on a surface to which it is applied. Bentonite may be used in small amounts as it also will act as a thickening and stabilizing agent.

Particular care should be taken when the composition contains abrasives to see that the wax and resin or resin-like substances and their solvents are ones which will impart a low viscosity and a relatively low evaporation rate to the composition, otherwise too much effort will be required in using the composition on a surface to be cleaned and treated. If the surfaces to be treated are relatively clean and such as not to require that the composition contain an abrasive, solvents, waxes and resins, can be used which will give compositions of higher viscosities, resulting in a thicker film being deposited on the surface without reducing the ease of working. In either case, the evaporation rate should not be so high as to cause a too early crystallization of the wax which is present. When the wax crystallizes or separates out before the buffing of the surface, the buffing is of crystals or particles of wax instead of a liquid film of wax and, consequently, much greater effort is required.

When an abrasive is used, it may be present to the extent of from about 5% to 15%.

The use of a substance such as polyvinyl alcohol of medium viscosity, such as, 22 centipoises at 20° C. in a 4% solution, as a water-soluble, film-forming agent is desirable. It acts, on drying of the composition on a surface, to form a water-soluble film on top of the oil-wax film which contains the abrasive and the dirt removed from the surface, thereby binding the abrasive and dirt together for clean removal from the surface without leaving streaks. It eliminates greasiness or oiliness by preventing dirt solids from being left in the oil layer.

The polyvinyl alcohol is not soluble in oils, but possesses emulsifying properties, and has strong film-forming characteristics. It should be used in relatively small amounts such as between about 0.03% to 0.2%. If used in substantially larger amounts, the dirt layer tends to set up in the oil layer or film and thereby makes removal of dirt and abrasive difficult. That probably is due to the emulsifying properties of the polyvinyl alcohol, inasmuch as this same tendency is found when increased amounts of other emulsifying agents are used.

Other film-forming agents which may be used are water-soluble gums such as gum tragacanth, or celloulose esters. However, we prefer to use polyinvyl alcohol.

While a polyvinyl alcohol of a viscosity of 22 centipoises at 20° C. in a 4% solution, that is, from about 86% to 89% hydrolyzed, has been found quite satisfactory, the viscosity may vary from about 4 to 100 centipoises at 20° C. in a 4% solution, that is, from about 40% to 100% hydrolyzed, although the lower or medium viscosities are preferred because of their greater solubility in water.

The thickening or bodying agent which we use, when the compositions contain an abrasive, to stabilize the emulsion and to keep the abrasive from settling preferably is an alkali metal carboxy alkyl cellulose, such as sodium carboxy methyl cellulose. It gives body to the composition, decreases settling of the abrasive on long standing and, like the polyvinyl alcohol, acts as a film-forming agent which tends to bind any abrasive present and dirt into an outer or overlying film which is plasticized with glycerine and a small amount of retained water. It preferably is of a viscosity corresponding to about 2000 centipoises at 25° C. in a 1% solution, and is substituted to the extent of approximately 0.75 carboxymethyl groups for each anhydrous glucose unit in the cellulose molecule. It is added to the extent of from between about 0.1% and 0.4%, when added at the above viscosity. If a lower viscosity product is used, it is desirable to use a considerably larger amount. For example, if the alkali metal carboxy alkyl cellulose should be of such low viscosity as to correspond to about 25 centipoises in a 2% solution, it may be desirable to use as much as 4%. Whether the alkali metal carboxy alkyl cellulose is of high, medium or low viscosity, and the amount used, will depend at least to some extent on the quantity of emulsifying agent which is present. The use of less emulsifying agent requires the use of less of the alkali metal carboxy alkyl cellulose, and vice versa.

The alkali metal carboxy alkyl cellulose should not be used in too large amounts because of its tendency to take up water available for cleaning, although it is beneficial to the extent above indicated and desirable as it imparts the right consistency and stability to the composition.

In place of the alkali metal carboxy alkyl cellulose, we may use such substances as lotus bean, gum tragacanth, hydroxylated methyl cellulose, methyl cellulose and ethyl hydroxyethyl cellulose. However, the ethyl hydroxyethyl cellulose does not function as well when the compositions contain gelatin; and the methyl cellulose will not hold any abrasive which is present in suspension as well; it also does not function as well with gelatin.

Along with the alkali metal carboxy alkyl cellulose, it is preferred to use, as an additional gelling agent, from about 0.05% to 0.6% of gelatin. Along with the alkali metal carboxy alkyl cellulose it forms a thixotropic gel so that the constituents of the composition will be held in stable suspension on long standing. When added in the above amount along with the alkali metal carboxy alkyl cellulose, the resulting gel may be quickly broken by shaking to give a fluid composition which is readily applied. After a few hours the gel will reform.

The use of gelatin along with the alkali metal carboxy alkyl cellulose will not cause increased thickness or body to be imparted to the compositions, except for gelling. However, when gelatin is present, the compositions will be thinner after the gel is broken by shaking.

We have found that in order to produce satisfactory gels, the composition should contain both gelatin and an alkali metal carboxy alkyl cellulose and a small amount of emulsifying agent, as those compounds appear to act synergistically, that is, they modify the action of one another in imparting a proper gel to the composition. The use of either without the other does not result in a gel which will hold the components of the composition in stable suspension. By properly varying the relative amounts of the gelatin, the alkali metal carboxy alkyl cellulose and the emulsifying agent present, any desired degree of viscosity and gel of the composition may be obtained. Too much emulsifying agent will reduce the gelling properties.

The addition of a small amount of a substance such as calcium chloride or ammonium chloride will decrease the gelling action temperature and thus enable the use of a lesser amount of the gelling agent to obtain the same gelling action. Additions of small amounts of iron oxide or other metallic ions also seem to increase the gelling properties of the compositions considerable.

Although the polyvinyl alcohol is itself an emulsifying agent and aids in forming an emulsion, it is not used in amounts sufficient to produce a fine enough emulsion. Therefore, the use of an additional emulsifying agent is desirable. The additional emulsifying agent may be any one of which is water-soluble and which readily will form a fine and stable emulsion. It may be non-ionic, such as dioctyl sodium sulfosuccinate, anionic, or cationic such as the esters of fatty acid amines. The latter are particularly desirable when used along with acetic acid, as on drying they will deposit a film of the corresponding acetate which is not water soluble, will repel dust, eliminate water spotting, and protect the resinous film during its period of drying or setting, similarly to the manner in which the wax protects the resinous film, as previously described. They also have the property of increasing the wetting and cleaning powers of the composition, and of repelling dust and similar accumulations from surfaces which have been treated with the composition. Other emulsifying agents which have satisfactorily been used along with the water-soluble emulsifying agents are ammonia together with fatty acids and polymerized ethylene oxide.

We prefer to use water soluble emulsifying agents in order that in use of the compositions they may be removed along with the gum film, or the dirt-abrasive-gum film to which they have a greater affinity upon breaking of the emulsion.

When ammonia and stearic acid are used as the emulsifying agents, and the composition is applied to a surface, the ammonia evaporates off with the water and leaves the stearic acid as a part of the wax of the resulting coating and thereby assists in imparting water resistance to the coating which is left on the surface.

The presence of polymerized ethylene oxide is not necessary, but it makes possible the formation of a very fine and even particle size emulsion, even when the best emulsifying equipment is not used and does not seem to give increased tendency to water-spotting.

The emulsifying agents should be present in an effective amount, but should not exceed about 0.5% when an abrasive is present, nor about 1% when the compositions contain no abrasive. Compositions containing such an amount of emulsifying agents are of excellent stability, both to heat and freezing, will hold the abrasive in suspension on long standing and will not cream or form separate layers on standing which would require shaking before applying the composition. Also, they will not water-spot or leach and have excellent cleaning properties. We have found that increasing the amount of emulsifying agents, at least those which are water-soluble, over that specified above actually tends to thin the emulsion and to reduce stability of the composition, to reduce the gelling, and to cause separation on standing, notwithstanding the greater ease of initially forming a good emulsion. The use of a greater amount of emulsifying agent, in most cases, also will increase the tendency of water to spot the resin or resin-like film which is deposited and to leach the resin or resin-like substance therefrom. When the composition contains an abrasive in the water phase, such emulsifying agents will give the abrasive an affinity for oil and thereby aid its suspension in the composition.

Having the composition in the form of an oil-in-water emulsion is desirable as it appears better to loosen dirt from surfaces to be treated and enhances its cleaning power by reduction of the interfacial tension between the water and dirt solvent. It also increases the wetting ability of the water for dirt.

The emulsifying agents should not be too compatible with the resinous constituents of the compositions. The fact that the chlorinated paraffins have proven so satisfactory as the resinous constituent of the compositions may be due to the fact that they will not readily emulsify unless it is dissolved in a solvent carrier.

As already indicated, it also is desirable that the compositions contemplated by this invention include a small amount of glycerine, for example, from about 0.6% to 5%. Glycerine being incompatible with the mineral oil which carries the wax and a part of the resin or resin-like substance forms a layer or film over it, and, being highly hygroscopic, acts, along with retained water, the polyvinyl alcohol, gelatin, and the alkali metal carboxy alkyl cellulose, all of which are water-soluble, to separate the water-soluble and the water-suspended materials from the oil-soluble and oil-suspended materials, and thereby hold the water-soluble and water-suspended materials in a separate layer or film on top of the oil-wax film, making it easily wiped off along with entrained dust and dirt, and making it possible to polish one liquid film with a second liquid film, thereby reducing any tendency to streak or leave polishing marks, and enabling a brilliant initial shine to be imparted to any surface treated. Glycerine also prevents abrasive particles present from absorbing and removing oil, and thus renders the compositions more effective. It also decreases the drying rate of the compositions when applied to surfaces, which in the warm summer season is desirable in order to obtain a desired cleaning.

The amount of glycerine present should not exceed about 5%. If present above that amount, excessive oiliness results, and a too slow rate of drying will reduce the ease of removal of the dirt-containing film.

It sometimes may be desirable to replace some of the glycerine with the alkali metal carboxy alkyl cellulose, although usually the glycerine is a desirable component of the composition because of its plasticizing effect on the polyvinyl alcohol, due both to its own inherent plasticizing properties, and to its hygroscopic characteristics. It also acts as a plasticizer for the alkali metal carboxy alkyl cellulose, when both are present in the composition.

A preservative agent such as sodium benzoate, furfural, formaldehyde, chloroform, etc. in the amount of from about 0.6% to 0.16% may be added to inhibit fermentation or mold growth which otherwise may result because of the presence of the alkali metal carboxy alkyl cellulose and the gelatin.

If a more pleasing odor for the compositions is desired than is imparted by the admixture of the various components of the composition, pine oil or any other known scenting agent may be used in such amount as to impart the desired scent or odor to the composition; likewise, any desired coloring agent may be added.

Illustrative examples of compositions which we have found to be highly satisfactory for cleaning and polishing lacquered and like surfaces are as follows:

*Example I*

| | Per cent |
|---|---|
| 70% chlorinated paraffin resin | 15 |
| Butyl oleate | 10 |
| Light mineral oil | 25 |
| Fatty acid amine acetate | 1 |
| Glycerin | 2 |
| Water | 47 |

*Example II*

| | Per cent |
|---|---|
| 70% chlorinated paraffin resin | 5 |
| Butyl stearate | 5 |
| Light mineral oil | 15 |
| Polyvinyl alcohol | 0.2 |
| Glycerin | 3 |
| Water-soluble emulsifying agent | 0.5 |
| Water | 71.3 |

Example III

| | Per cent |
|---|---|
| Coumarone indene resin | 3 |
| Methyl oleate | 1 |
| Light lubricating oil | 10 |
| Trichlorethylene | 3 |
| Diethylene glycol monoethyl ether | 1 |
| Carnauba wax | .02 |
| Beeswax | .05 |
| Polyvinyl alcohol | .1 |
| Dioctyl sodium sulfosuccinate | .05 |
| Glycerin | 2 |
| Abrasive | 10 |
| Ethyl hydroxy ethyl cellulose (high viscosity type) | .6 |
| Water | 69.18 |

In Examples I and II above, the compositions contain no wax and the mineral oil, in addition to its solvent and diluent and carrier functions, also functions as the oleaginous or unctuous ingredient to eliminate tackiness of deposited resinous films during their drying. In the other examples, the wax which is present serves that purpose.

In using the compositions of the present invention, as, for example, in cleaning and polishing the body of an automobile, an amount thereof may be poured directly onto the automobile body, or it may be poured onto a cloth and rubbed onto the automobile body, or spread thereon so as to form a more or less uniform layer thereon. Mere rubbing of the composition onto the automobile body to form a uniform layer will be sufficient to loosen adhering dirt and oxide films and to cause the emulsion to break and resolve itself into two separate layers. The layer next to the body surface will contain most of the resin or resin-like substance, and the solvent therefor along with the major portion of the wax and the mineral oil, while the outer or top layer will contain most of the water, the bodying, emulsifying, gelling and stabilizing agents used, and the water-miscible dirt solvents. The dirt or oxide film loosened from the surface being treated by the abrasive and the dirt solvents or cleaning aids will be carried into the outer layer containing the water, the thickening or bodying agents and the water-miscible dirt solvents, partially due to evaporation and partially due to the coupling and emulsifying agents used, where it will be held for subsequent ease of removal.

After the composition has been applied it is permitted to stand for 5 minutes or more to permit the water and low-boiling solvents to evaporate and to let water-soluble gum-like substances dry or take an initial set, after which they may be rubbed off. The dirt solvents and the water quickly evaporate from the outermost layer, but the mineral oil in which the wax is dissolved to the extent of its solubility, and suspended wax crystals or particles, remains, to a large extent, as part of the underlying film containing the resin or resin-like substance. After the removal of the top dirt layer, the mineral oil of the underlying layer will evaporate within a few hours or a day or two, depending upon its evaporation rate and leave a surface or film of wax on the top of the resinous film which will protect it from dust and possible rain spotting, and eliminate its natural tackiness until it has dried or set, which may take from a few days to a week or two. The overlying layer of wax will naturally contain some resin but will essentially have a waxy and slippery character, so that dust collected during this period can easily be wiped off without injuring the resin film and in so doing will restore and preserve the gloss of the film until the resin has lost all its solvents and has formed a hard and tough film partially plasticized with part of the wax.

As the emulsion quickly breaks and resolves itself into separate layers during application, and as the hydraulic friction between two liquid layers is small, relatively little effort is required to apply it. Likewise, relatively little effort is required to buff the surface, after the applied layer of the composition has dried, to a high shine. That is due to the fact that the shine is imparted essentially by the lustrous nature or clarity of the deposited resinous-oil film, so that mere removal of the overlying dirt layer is sufficient. It is not necessary to continue the buffing until any wax crystals or particles have been so rearranged that a high shine is obtained, because the waxes are in solution.

While the invention has been described in some detail and examples of compositions which we presently prefer for combined cleaning, polishing and coating compositions for lacquered surfaces have been given, it is to be understood that the invention is not limited by such detailed description and the examples, and various changes may be made within the scope of the appended claims.

The term "resinous material" is used in the appended claims to define molecular aggregates of much higher weight than the waxes which show some degree of polymerization.

We claim:

1. A combined cleaning and polishing emulsion of the oil-in-water type comprising, by weight, from about 20% to 90% water in the continuous phase, a film-forming, water-insoluble and oil-soluble resinous material having a melting point not lower than about 50° C., an oil-miscible and water-immiscible solvent for the resinous material, a solvent which is miscible with both oil and water, a water-soluble film-forming agent comprising polyvinyl alcohol, and an emulsifying agent, the total amount of emulsifying agent not exceeding about 1%, the resinous material and the solvent therefor being in the dispersed phase, and the film-forming agent and the emulsifying agent being in the continuous water phase.

2. The emulsion of claim 1 in which the resinous material includes a resinous, normally solid halogenated hydrocarbon.

3. The emulsion of claim 1 in which the resinous material includes a chlorinated paraffin wax.

4. The emulsion of claim 1 which includes an alkali-metal carboxy alkyl cellulose in the continuous water phase.

5. A combined cleaning and polishing emulsion of the oil-in-water type comprising, by weight, from about 20% to 90% water in the continuous phase, from about 0.1% to 40% of a film-forming, water-insoluble and oil-soluble resinous material having a melting point not lower than about 50° C., an oil-miscible and water-immiscible solvent for the resinous material, an abrasive, a solvent which is miscible with both oil and water, an emulsifying agent including anionic and non-ionic compounds, from about 0.03% to 0.2% of polyvinyl alcohol, from about 0.1% to 4% of an alkali-metal carboxy alkyl cellulose, and from about 0.05% to 0.6% of gelatin, the total amount of emulsifying agent not exceeding about 0.5%, the resinous material and the solvent therefor being in the dispersed phase, and the polyvinyl alcohol, the alkali-metal carboxy alkyl cellulose and the gelatin being in the continuous water phase.

6. A combined cleaning and polishing emulsion of the oil-in-water type comprising, by weight, from about 20% to 90% water in the continuous phase, a film-forming, water-insoluble and oil-soluble resinous material having a melting point not lower than about 50° C., an oil-miscible and water-immiscible solvent for the resinous material, an unctuous material, at least a portion of which normally is solid, a water-soluble film-forming agent comprising polyvinyl alcohol, and a water-soluble emulsifying agent, the total amount of emulsifying agent not exceeding about 1%, the resinous material, the solvent for the resinous material and the unctuous material being in the dispersed phase.

7. The emulsion of claim 6 in which the resinous material includes a chlorinated paraffin wax.

8. The emulsion of claim 6 which includes an alkali-metal carboxy alkyl cellulose in the continuous water phase.

9. A combined cleaning and polishing emulsion of the oil-in-water type comprising, by weight, from about 20% to 90% water in the continuous phase, from about 0.1% to 40% of a film-forming, water-insoluble and oil-soluble resinous material having a melting point not lower than about 50° C., an oil-miscible and water-immiscible solvent for the resinous material, from about 0.05% to 10% of wax, an abrasive, an emulsifying agent including anionic and non-ionic compounds, from about 0.03% to 0.2% of polyvinyl alcohol, from about 0.1% to 4% of an alkali-metal carboxy alkyl cellulose, from about 0.05% to 0.6% of gelatin, and from about 0.6% to 5% of glycerin, the wax being present in amount less than the resinous material, the total amount of emulsifying agent not exceeding about 0.5%, the resinous material, the solvent for the resinous material and the wax being in the dispersed phase, and the polyvinyl alcohol, the alkali-metal carboxy alkyl cellulose, the gelatin and the glycerin being in the continuous water phase.

10. A combined cleaning and polishing emulsion of the oil-in-water type comprising, by weight, from about 20% to 90% water in the continuous phase, a film-forming, water-insoluble and oil-soluble resinous material having a melting point not lower than about 50° C. and including a normally-solid halogenated hydrocarbon, an oil-miscible and water-immiscible solvent for the resinous material, a solvent which is miscible with both oil and water, a water-soluble film-forming agent, and an emulsifying agent, the total amount of emulsifying agent not exceeding about 1%, the resinous material and the solvent therefor being in the dispersed phase, and the film-forming agent and the emulsifying agent being in the continuous water phase.

11. A combined cleaning and polishing emulsion of the oil-in-water type comprising, by weight, from about 20% to 90% water in the continuous phase, a film-forming, water-insoluble and oil-soluble resinous material having a melting point not lower than about 50° C., an oil-miscible and water-immiscible solvent for the resinous material, a solvent which is miscible with both oil and water, a water-soluble film-forming agent, an alkali-metal carboxy alkyl cellulose, and an emulsifying agent, the total amount of emulsifying agent not exceeding about 1%, the resinous material and the solvent therefor being in the dispersed phase, and the film-forming agent, the alkali-metal carboxy alkyl cellulose and the emulsifying agent being in the continuous water phase.

12. A combined cleaning and polishing emulsion of the oil-in-water type comprising, by weight, from about 20% to 90% water in the continuous phase, a film-forming, water-insoluble and oil-soluble resinous material having a melting point not lower than about 50° C. and including a chlorinated paraffin wax, an oil-miscible and water-immiscible solvent for the resinous material, an unctuous material, at least a portion of which normally is solid, a water-soluble film-forming agent, and a water-soluble emulsifying agent, the total amount of emulsifying agent not exceeding about 1%, the resinous material, the solvent for the resinous material and the unctuous material being in the dispersed phase.

13. A combined cleaning and polishing emulsion of the oil-in-water type comprising, by weight, from about 20% to 90% water in the continuous phase, a film-forming, water-insoluble and oil-soluble resinous material having a melting point not lower than about 50° C., an oil-miscible and water-immiscible solvent for the resinous material, an unctuous material, at least a portion of which normally is solid, a water-soluble film-forming agent, an alkali-metal carboxy alkyl cellulose, and a water-soluble emulsifying agent, the total amount of emulsifying agent not exceeding about 1%, the resinous material, the solvent for the resinous material and the unctuous material being in the dispersed phase.

CARSTEN F. BOE.
WILLIAM R. LOWSTUTER.

REFERENCES CITED

The following references are of record in the file of this patent:

UNITED STATES PATENTS

| Number | Name | Date |
|---|---|---|
| 2,178,474 | Frick | Oct. 31, 1939 |
| 2,250,346 | Barrell | July 22, 1941 |
| 2,335,324 | Tumbler | Nov. 30, 1943 |
| 2,370,057 | Mack | Feb. 20, 1945 |